(12) United States Patent
Matsuura et al.

(10) Patent No.: US 6,415,810 B2
(45) Date of Patent: Jul. 9, 2002

(54) WATER HAMMERING PREVENTION DEVICE (75) Inventors: Nobuyuki Matsuura; Makoto Kato, both of Komaki (JP)

(73) Assignee: Kane Kougyou Co., Ltd., Komaki (JP)

(*) Notice: Subject to any disclaimer, the term of this patent is extended or adjusted under 35 U.S.C. 154(b) by 0 days.

(21) Appl. No.: 09/747,379

(22) Filed: Dec. 21, 2000

(30) Foreign Application Priority Data

Dec. 22, 1999 (JP) .......................................... 11-363976

(51) Int. Cl.[7] .............................................. F16K 47/02
(52) U.S. Cl. ...................................... 137/218; 137/543
(58) Field of Search ................................. 137/218, 543

(56) References Cited

U.S. PATENT DOCUMENTS

| 3,744,507 A | * | 7/1973 | Oberthur | 137/107 |
| 3,818,929 A | * | 6/1974 | Braukmann | 137/218 |
| 3,905,382 A | * | 9/1975 | Waterston | 137/218 X |
| 3,908,689 A | * | 9/1975 | Wingate | 137/149 |
| 4,013,089 A | * | 3/1977 | Braukmann | 137/218 |
| 4,518,006 A | * | 5/1985 | Hoffmann et al. | 137/107 X |
| 5,960,818 A | * | 10/1999 | Hecking | 137/218 |

FOREIGN PATENT DOCUMENTS

DE 24 14 893 * 10/1975 ................. 137/218

* cited by examiner

Primary Examiner—Gerald A. Michalsky
(74) Attorney, Agent, or Firm—Flynn, Thiel, Boutell & Tanis, P.C.

(57) ABSTRACT

A water hammering prevention device including an outer box defining a flow path having an inlet, an outlet and a drain port in a midstream section thereof. An inner tube member has a diaphragm on its periphery dividing the inside of the outer box into an upstream section, and an area consisting of a midstream section and a downstream section of the flow path. A relief valve is provided and is caple of moving toward or away from a valve seat located on the periphery of a valve port provided between the midstream section and the downstream section. A check valve is provided inside the inner tube member to prevent fluid from flowing backward from the downstream side, and to discharge pressurized fluid generated by water hammering to the outside via the drain port.

13 Claims, 9 Drawing Sheets

WATER HAMMERING PREVENTION DEVICE

BACKGROUND OF THE INVENTION

1. Field of the Invention

The invention relates to a water hammering prevention device.

2. Description of the Prior Art

It has been a common practice to use an accumulator installed in the middle of the piping system of the water supply device to achieve such an object.

Such a device has a sealed container whose inside is divided into the water supply pressure side and the pressure suction side by means of a rubber bladder, diaphragm, piston,. etc., so that the pressure surge due to the water hammering action generated at the water supply pressure side can be absorbed.

However, there was a limit to the absorption of the pressure surge due to the water hammering action because the pressure absorption side of the abovementioned device is a closed space.

SUMMARY OF THE INVENTION

With the abovementioned problem in mind, the present invention intends to provide a water hammering prevention device including: an outer box having concentric flow paths for an inlet and an outlet and a drain port in the midstream section of the flow path; an inner tube member having a diaphragm on its periphery dividing the inside of the outer box into an upstream section and an area consisting of a midstream section and a downstream section of the flow path, wherein the inner tube member slidingly fits into the upper section; a relief valve is provided on the end face of the downstream side opening of the inner tube member and the relief valve is capable of moving toward or away from a valve seat located on the periphery of a valve port provided between the midstream section and the downstream section and energized by a relief valve spring toward the valve opening direction; and a check valve provided inside the inner tube member to prevent fluid from flowing backward from the downstream side, thus solving the abovementioned problem by discharging the pressurized water caused by the water hammering action to the outside via the drain port.

The invention, constituted as such, checks the upstream side with the check valve 5 and opens the relief valve 4 when the back pressure rises above the upstream pressure due to water hammering, so that the back pressure from downstream can be discharged to the outside through the drain port 9, thus eliminating noise and vibration due to water hammering completely and drastically reducing piping system problems, which used to be caused at least partially by noise and vibration due to water hammering.

In accordance with one aspect of the invention, the water hammering prevention device is installed parallel to the check valve 38 installed in the piping 39 of the water supply device 34, or directly in the piping 39, and the drain port 9 is connected via piping to the water receiving tank 35, so that it not only prevents water hammering completely but also it adds an economic effect of eliminating wasteful use of water as the water drained from the drain port 9 is returned to the water receiving tank 35.

In accordance with another aspect of the invention, a water hammering prevention device is connected to each of the terminal devices 51, 51a of the water supply device 45 and their drain ports 9 are connected to the outside, so that it is capable of preventing water hammering caused by frequent high back pressure rises due to repeated turning on and off of the water supply, particularly when the terminal devices 51, 51a are high pressure water injection guns, by discharging the high pressure fluid to the outside through the drain port 9.

By connecting the drain ports 9 via piping to the water receiving tank 47, water waste can be prevented as well.

In accordance with a further aspect of the invention, the effective diameter $D_1$ of the diaphragm 14 and the valve seat diameter $D_2$ of the valve seat 11 are chosen to be about equal so that the valve closing pressure of the relief valve 4 that the diaphragm 14 receives and the valve opening pressure that the relief valve 4 itself receives can be balanced and the spring loads F and f of the relief valve spring 17 and the check valve spring 28 respectively are chosen to maintain the pressure $P_2$ of the midstream section 8b always lower than the upstream side pressure $P_1$ by a margin of $\Delta P$ of a constant value. It is therefore possible to provide, by setting the pressure difference $\Delta P$ between the pressure $P_2$ of the midstream section 8b and the upstream side pressure $P_1$ to match the individual characteristic of a water supply device, a specific valve opening characteristic for the relief valve 4 to suit the characteristics of a particular water supply device, thus being able to provide a water hammering prevention device 1 that fits with any water supply device.

In accordance with another aspect of the invention, the inner tube member 3 is formed to have a circular cross section, while the sliding surface 12 of the inside of the outer box 2 that fits with the inner tube member 3 has grooves 13, 13a equally spaced along its circumference, so that it is possible to reduce the sliding contact area between the inner tube member 3 and the sliding surface 12 and to make the inner tube member 3 thinner and lighter without sacrificing strength, thus contributing to reducing the sliding resistance of the inner tube member 3 as much as the strength of the inner tube member allows. Consequently, it is possible to improve the water supply performance because of the reduction of the pressure loss of the pressurized fluid during the water supply period and to use a smaller water supply pump for the water supply device.

In accordance with yet another aspect of the invention, it is possible to reduce the friction resistance of the inner tube member 3 against the outer box 2 because of a coating on the outer circumference of the inner tube member 3 of Teflon and to reduce the pressure loss in the same way as in the case above.

In accordance with still another aspect of the invention, the check valve 5 has a flat surface 30 formed on its face 29 confronting the check valve port 18, the surface having a diameter smaller than the check valve port 18, and a conical apex 31 formed in the middle of the flat surface 30. Furthermore, multiple tilting grooves 33, 33a are provided having a groove width decreasing gradually toward the center of the back of the check valve 5 from the outer periphery, which is further outside of a seating area 32 corresponding to the check valve seat 19. These tilting grooves 33, 33a are equally spaced in the circumferential direction on the check valve 5. As a result, water flows smoothly from upstream to downstream along the shape of the check valve 5 without causing any swirls on the back of the check valve 5, thus minimizing the pressure loss due to the check valve inserted in the flow path 8. It provides similar effects as mentioned above and its practical benefit is significant.

BRIEF DESCRIPTION OF THE DRAWINGS

FIG. 10 is a drawing showing an example of piping for a water supply device with the water hammering prevention device built in.

DESCRIPTION OF THE PREFERRED EMBODIMENTS

Let us describe a preferred embodiment of the invention referring to the drawings.

Figure 1:
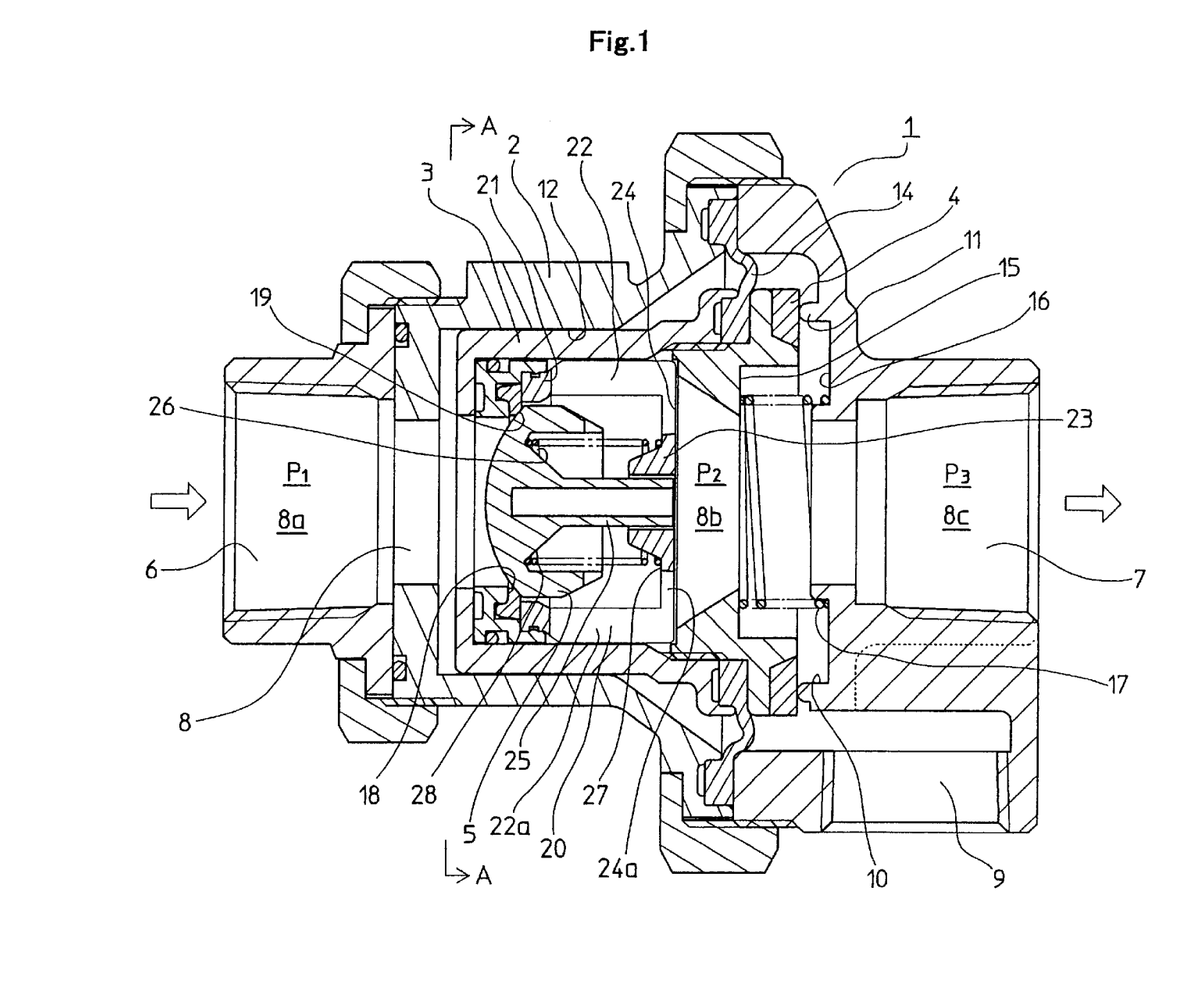
FIG. 1 is a cross sectional view showing the water hammering prevention device when water is not running.
Figure 2:
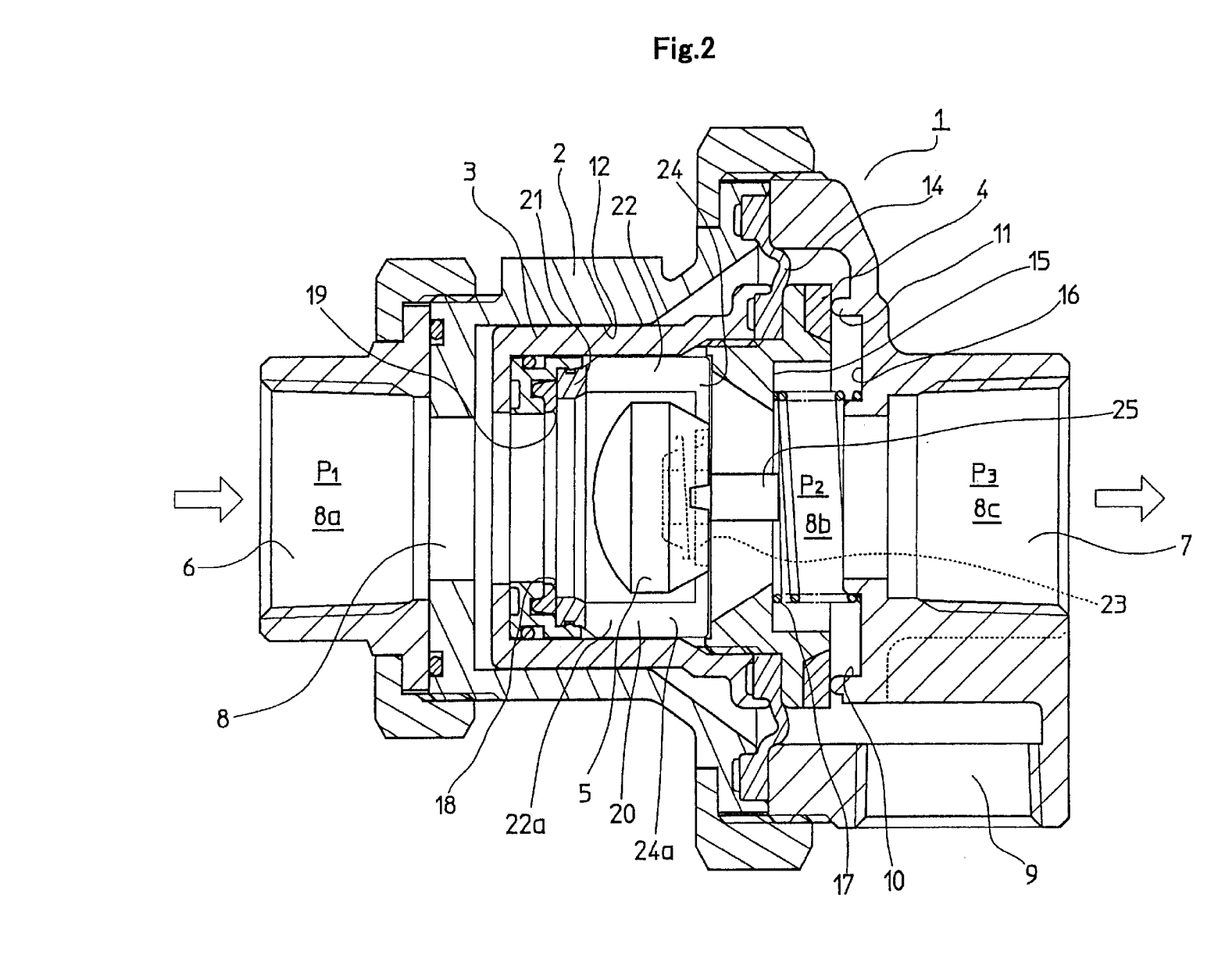
FIG. 2 is a cross sectional view showing the water hammering prevention device when water is running.
Figure 3:
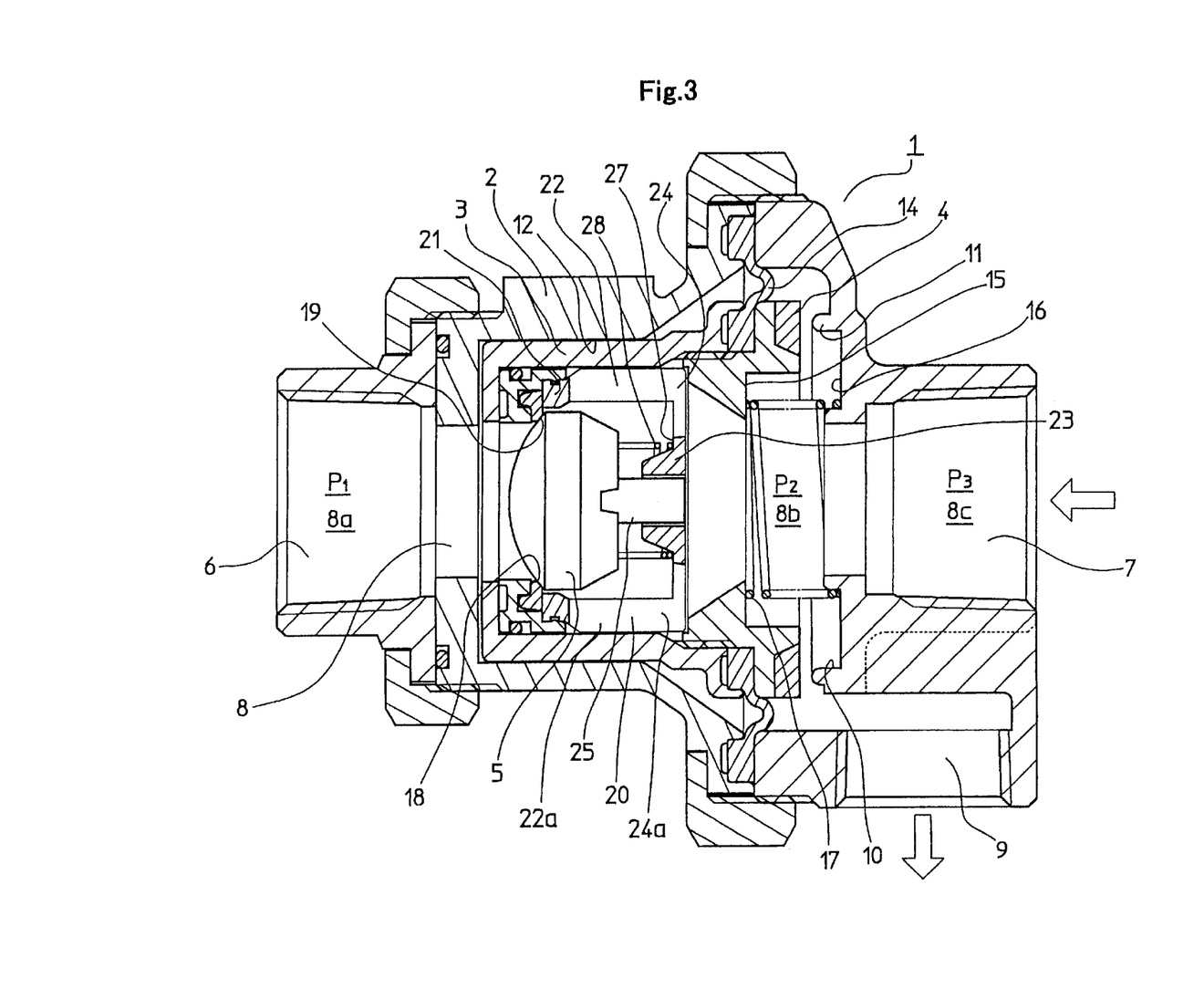
FIG. 3 is a cross sectional view showing the water hammering prevention device when water hammer occurred and it is draining water.

FIGS. 1 through 3 show the cross section of the water hammering prevention device according to the present invention in various conditions.

FIG. 1 shows the status when water is not running, FIG. 2 shows the status when water is running, and FIG. 3 shows water being drained as water hammering has occurred.

This water hammering prevention device 1 includes an outer box 2, an inner tube member 3, and relief valve 4 and a check valve 5.

The outer box 2 has concentric flow paths 8 for an inlet 6 and an outlet 7 that connects the upstream side and the downstream side of the water supply piping respectively and, in the midstream section 8b of said flow path 8, a drain port 9, which connects to the outside perpendicular to the flow path 8.

A valve port 10 is provided between the midstream section 8b and the downstream section 8c, and a valve seat 11 is provided on the periphery of said valve port 10.

Figure 5:
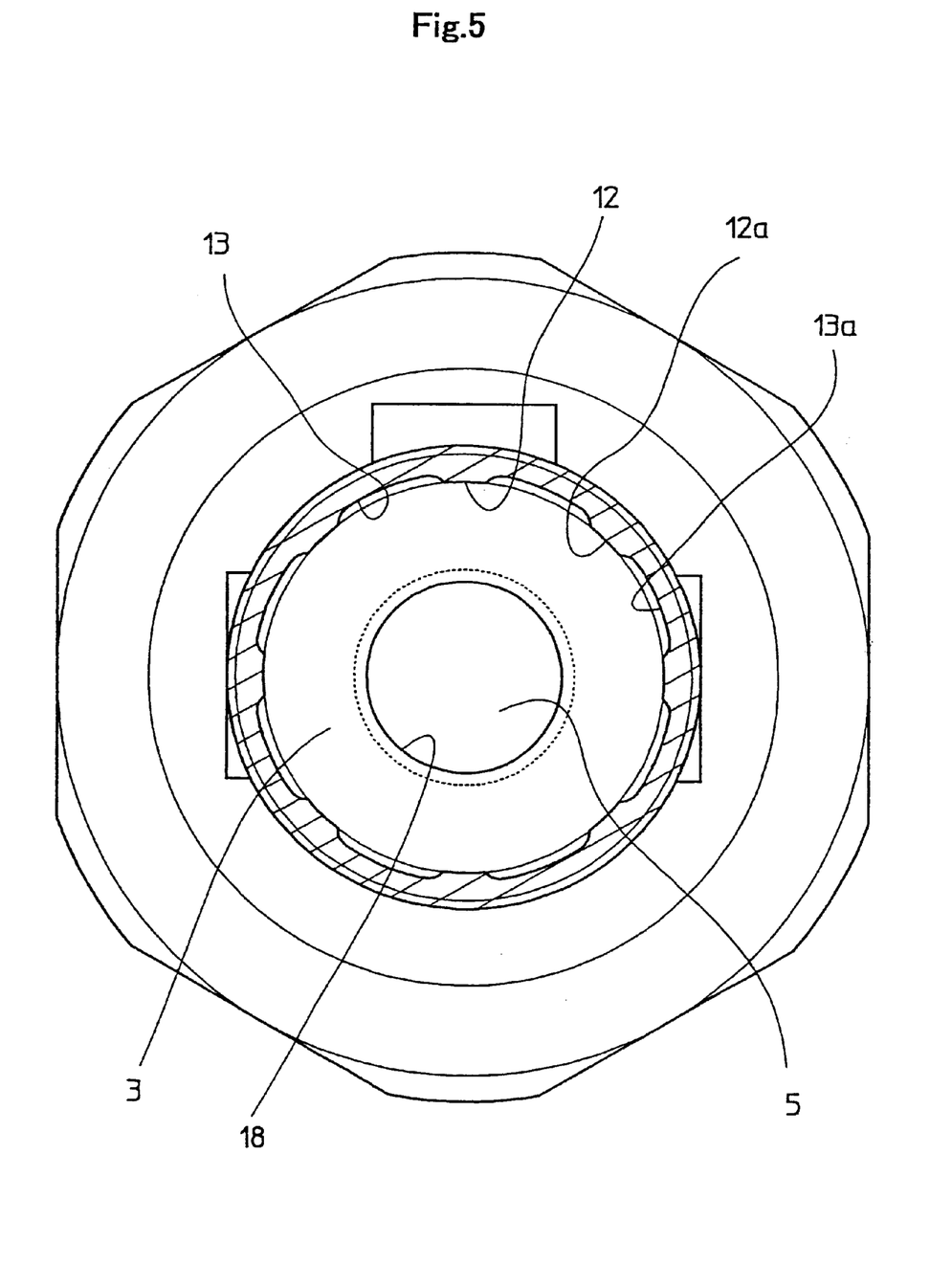
FIG. 5 is a cross sectional view along A—A of FIG. 1.

A sliding surface 12 is provided in the upstream section 8a to guide the inner tube member 3 and said sliding surface 12 has multiple grooves 13, 13a formed equally spaced in the circumferential direction on the circular inner face as shown in FIG. 5.

Its contact surface area against the inner tube member 3 is minimized by means of grooves 13, 13a formed on the sliding surface 12 in order to reduce the sliding resistance against the inner tube member 3.

The inner cylinder member 3 is shaped to be substantially cylindrical and fits into the upstream section 8a slidingly.

The reason that the inner surface (sliding surface 12) of the upstream section 8a is formed as described above instead of forming multiple grooves on the outer surface of the inner tube member 3 in order to decrease the sliding resistance of the inner tube member 3 is that it would be necessary to increase the thickness of the inner tube member 3 in order to keep the strength of the inner tube member 3, which would in essence increase the weight of the inner tube member 3, thus negating the purpose of reducing the friction resistance if multiple grooves are formed on the outer circumference of the inner tube member 3 or if the outer shape of the inner tube member 3 is formed into a polygon.

The sliding surface 12 in the upstream section 8a in this invention is formed as mentioned above and the outer shape of the inner tube member 3 is formed to be cylindrical, maximizing the resistance to external pressure, so that the inner tube member 3 can be made relatively thin and light.

The outer circumference of the inner tube member 3 is coated with Teflon, further reducing the friction resistance against said sliding surface 12, to minimize the sliding resistance.

A diaphragm 14 is provided on the downstream side outer circumference of the inner tube member 3 dividing the flow path 8 into an upstream section 8a and an area consisting of a midstream section 8b and a downstream section.

A relief valve 4 made of synthetic rubber is provided on the end face of a downstream side opening of said inner tube member 3.

This relief valve 4 is provided facing said valve seat 11 and is capable of moving toward or away from the valve seat 11 in accordance with the displacement of the diaphragm 14.

A relief valve spring 17 is provided between a small diameter step 15 located on said opening and a cavity 16, which is provided between the midstream section 8b and the downstream section 8c, and the relief valve spring 17 energizes the relief valve 4 toward valve opening direction.

A check valve 5 is formed substantially in a mushroom shape having a spherical crown and provided inside the inner tube member 3 to prevent fluid from flowing backward from the downstream side. The check valve 5 is provided in such a way as to be able to move toward or away from a check valve seat 19 located on the periphery of an upstream side opening of the inner tube member 3, which essentially forms a check valve port 18.

The check valve 5 is supported by a guide ring 20, which is provided to face the check valve seat 19 inside the inner tube member 3.

The guide ring 20, as shown in FIG. 1, comprises: a ring 21 that surrounds the outer periphery across a small gap when the check valve 5 is closed; multiple L-shaped support rods 22, 22a that are provided on the downstream side and face of said ring 21, equally spaced in the circumferential direction thereof, and protruding toward the downstream side; and a valve stem slide ring 23, which has a substantially truncated cone-shape and is connected to the bent ends of said support rods 22, 22a.

The spaces between the adjacent supporting rods 22, 22a form communicating openings 24, 24a between the inner tube member 3 and the midstream section 8b.

A valve stem 25 provided protrusively on the back of the check valve 5 is inserted into the valve stem slide ring 23 slidingly and a check valve spring 28 is provided between an annular cavity 26 provided around the valve stem 25 and a spring catch 27 which is provided flange-like and protrusively on the outer periphery of the base end of the stem slide ring 23, wherein said check valve spring 28 energizes the check valve 5 in the valve closing direction.

Next, let us describe a modified version of the check valve 5 referring to FIGS. 6 through 9.

Figure 6:
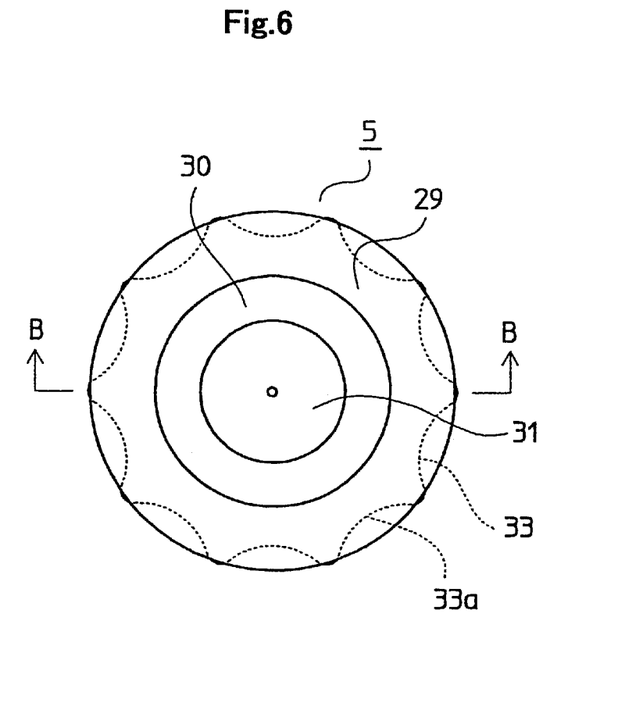
FIG. 6 is a plan view showing a modified version of the check valve.
Figure 7:
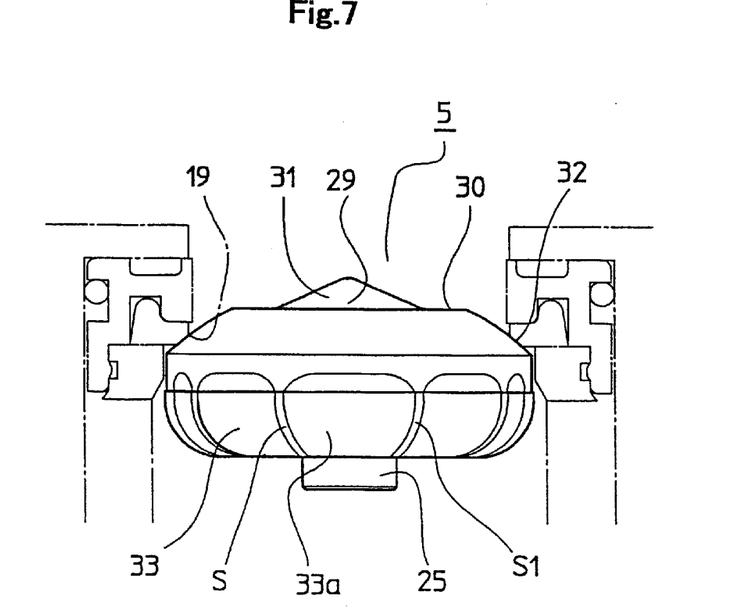
FIG. 7 is a front view of the check valve shown in FIG. 6.
Figure 8:
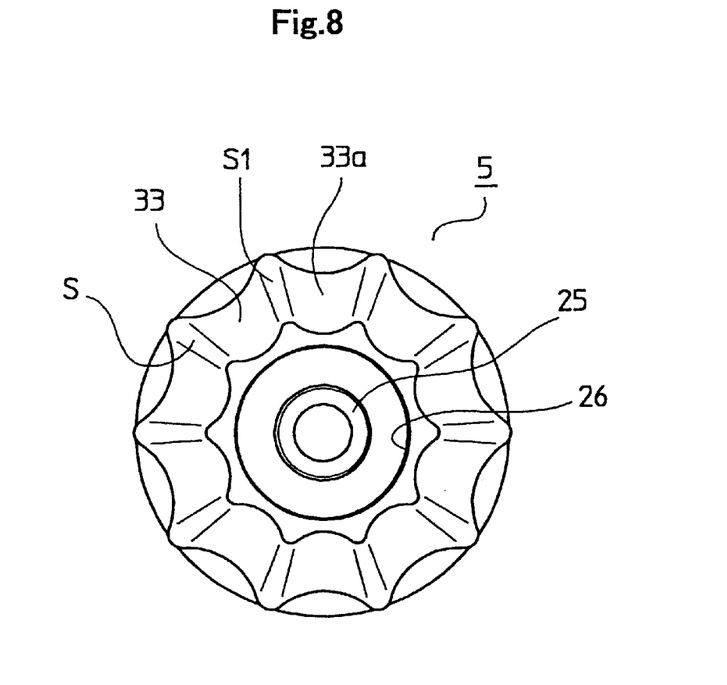
FIG. 8 is a bottom view of the check valve shown in FIG. 6.
Figure 9:
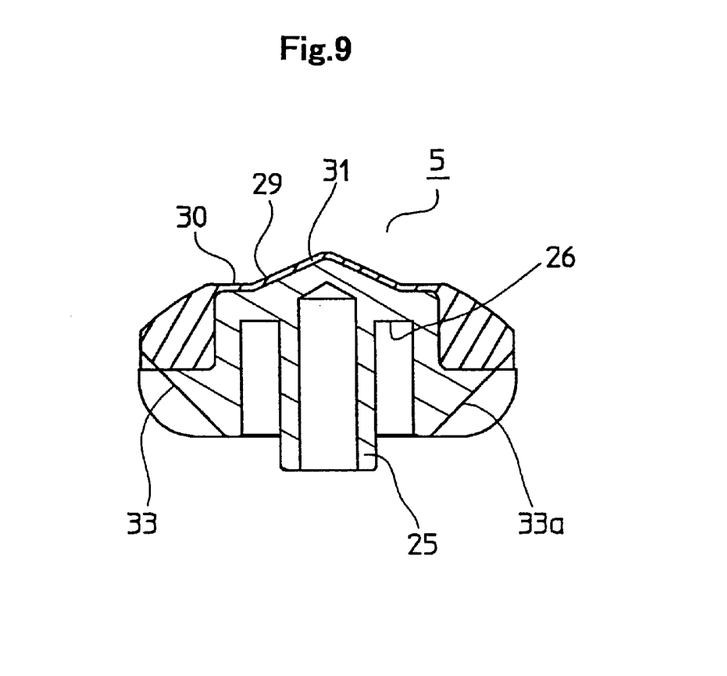
FIG. 9 is a cross sectional view along B—B of FIG. 6.

FIG. 6 is a plan view of the check valve 5, FIG. 7 is a front view, FIG. 8 is a bottom view, and FIG. 9 shows the B—B cross section of FIG. 6.

The check valve 5 is formed to be substantially a mushroom shape. It has a flat surface 30 formed on its face 29 confronting the check valve port 18, said surface having a diameter smaller than the check valve port 18, and a conical apex 31 formed in the middle of said flat surface 30.

Furthermore, multiple tilting grooves 33, 33a having a groove width decreasing gradually toward the center (valve stem 25) of the back of the check valve 5 from the outer periphery, which is further outside of a seating area 32 (area where the valve contacts with the check valve seat 19 when it is closed) provided outside of the flat surface 30 to correspond with the check valve seat 19.

These tilting grooves 33, 33a are equally spaced (across small gaps S, S1) in the circumferential direction on the check valve 5.

The face 29 of the check valve 5 shown in FIG. 9 is formed by coating synthetic rubber in a shape as described above.

Using the check valve 5 with such a shape, the water flow splits into multiple radial flows from the apex 31 on the face 29 when the valve is open, while the flat surface 30 receives the upstream side pressure to open fully instantaneously.

As it opens fully, the flow increases and the flow path from the outer periphery of the check valve 5 toward the downstream side will be controlled by means of the tilting grooves 33, 33a so that the water flow will be rectified and flow along the shape of the check valve 5 toward the downstream side.

It is also possible to control the pressure of the midstream section 8b of the water hammering prevention device 1 as described below.

Figure 4:
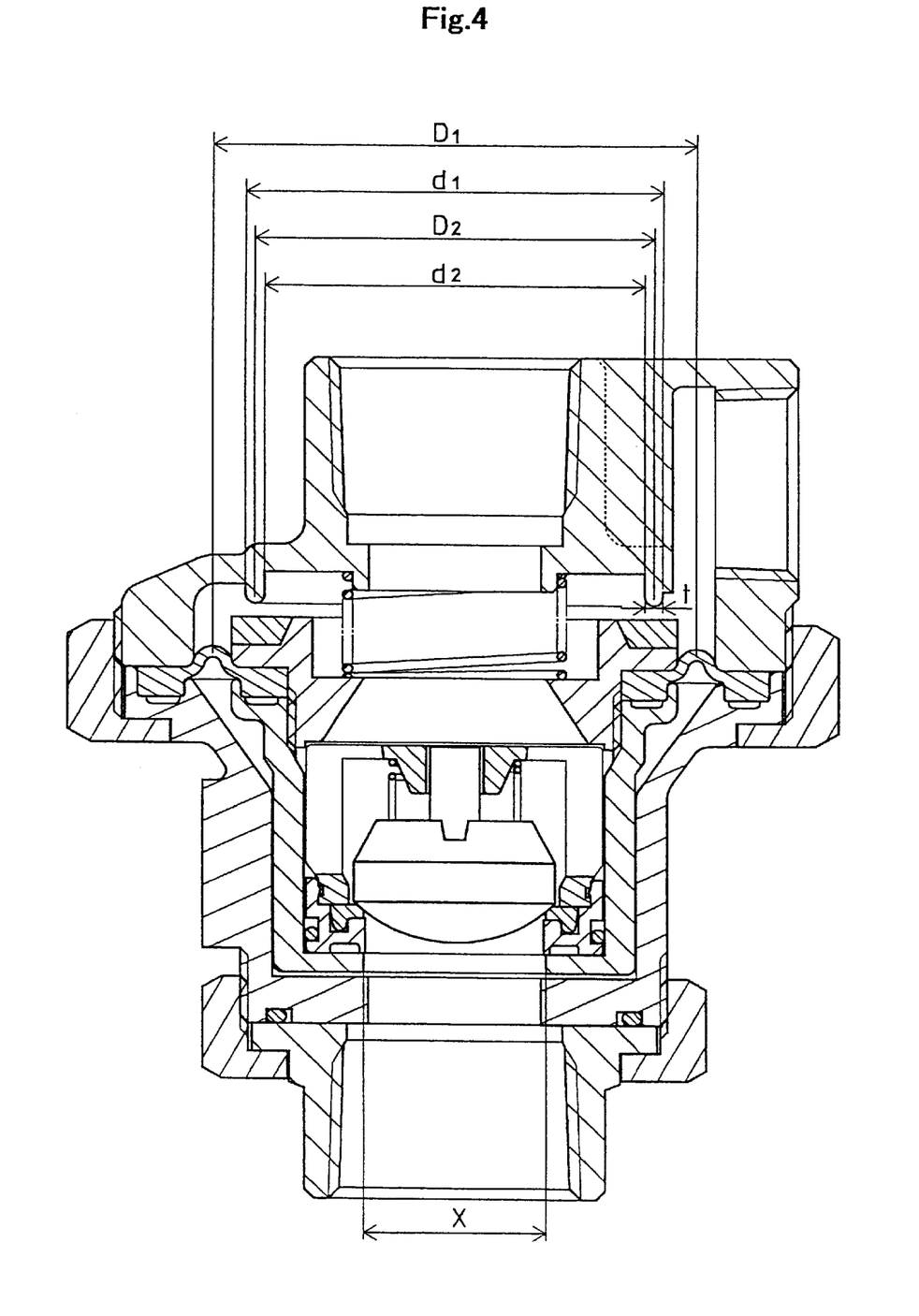
FIG. 4 is a drawing showing various dimensions of the water hammering prevention device.

The dimensions of various parts of water hammering prevention device 1 are shown in FIG. 4.

In this scheme, the water hammering prevention device 1 is controlled to open the relief valve 4 to maintain the pressure of the midstream section 8b always lower than the upstream pressure by a margin of a constant value when it is used within a certain application range of the upstream side pressure.

More specifically, the object of holding a balance between the valve closing pressure and the valve opening pressure that applies to the relief valve 4 can be achieved by choosing the effective diameter of the diaphragm 14 and the valve seat diameter of the relief valve 4 to be approximately equal (condition 1) and also by setting the spring loads of the relief valve spring 17 and the check valve spring 28 in such a way as to maintain the pressure of the midstream section 8b to be always lower than the upstream pressure by a margin of a constant value (condition 2).

The condition 1 can be achieved by satisfying the following equation:

$$A-B-C=D+\alpha \quad (1)$$

where

A: Valve closing force applied to the relief valve as the effective area of the diaphragm receives the upstream side pressure B: Valve opening force applied to the relief valve as the area inside the internal periphery of the valve seat of the relief valve receives the midstream pressure C: Valve opening force applied to the relief valve by the relief valve spring D: Pressing force (sealing force) applied to the relief valve (rubber) to close the relief valve α: Friction resistance force generated in the internal cylindrical member when the relief valve moves to open/close the relief valve Moreover, let:

$D_1$: Effective diameter of the diaphragm $D_2$: Diameter of the valve seat (measured at the middle of the seat width) of the relief valve $d_1$: Outer diameter of the valve seat of the relief valve $d_2$: Inner diameter of the valve seat of the relief valve $P_1$: Upstream pressure $P_2$: Midstream pressure (same as the downstream pressure)

E: Coefficient for opening the relief valve from the closed state (since E becomes smaller than the coefficient for closing the valve from the open state, it is assumed to be 1)

$\Delta P$: Pressure difference between the upstream side pressure and the midstream pressure when the relief valve is opened F: Spring load of the relief valve spring t: Thickness of the valve seat Expressing the equation (1) using the above symbols, we get:

$$\pi(D_1/2)^2 P_1 - \pi(D_2/2)^2 P_2 - F = (\pi(d_1/2)^2 - \pi(d_2/2)^2)P_2 E + \alpha \quad (1)'$$

Further, noting that:

$$P_2 = P_1 - \Delta P$$

$$d_1 = D_2 + t$$

$$d_2 = D_2 - t$$

and substituting the above into the equation (1)' above, we get $$(\pi P_1/4)(D_1^2 - D_2(D_2+4t)) = \alpha - ((\pi \Delta P D_2/4)(D_2+4t) - F) \quad (1)''$$

Therefore, by choosing the following conditions to hold the equation (1)'' true:

$$D_1^2 = D_2 (D_2+4t) \quad (2)$$

$$\alpha = (\pi \Delta P D_2/4)(D_2+4t) - F \quad (3)$$

we learn that the balance between the valve opening pressure and the valve closing pressure applied on the relief valve 4 can be maintained always without being affected by changes in the upstream pressure $P_1$.

Since $D_2 \gg t$, and $D_1^2 = D_2(D_2+4t)$, we get $D_1 \approx D_2$.

The condition 2 is to maintain the relief valve 4 closed under normal conditions (water running or stopped) and it requires that the water pressure of the water running through after the pressure reduction due to the check valve spring 28 has to be greater than the pressure of the midstream 8b.

This condition 2 can be expressed in the following equation:

$$\Delta P_1 > \Delta P + Pa + Pb \quad (4)$$

where, $\Delta P_1$: Pressure difference between the upstream side pressure and midstream section pressure caused by the check valve spring $\Delta P$: Pressure difference between the upstream side pressure and midstream section pressure when the relief valve is opened Pa: Pressure difference between the upstream side pressure and midstream section pressure caused by the relief valve spring Pb: Minimum pressure required for closing the relief valve ($\Delta P - \Delta P_1$)

Moreover, let:

x: Diameter of the valve seat (measured at the middle of the seat width) of the check valve $D_2$: Diameter of the valve seat (measured at the middle of the seat width) of the relief valve F: Spring load of the relief valve spring f: Spring load of the check valve spring then, the equation (4) can be rewritten as:

$$\Delta P_1 > \Delta P + Pa + (\Delta P - \Delta P_1),$$

or $$2f/(\pi(x/2)^2) > 2\Delta P + F/(\pi(D_2/2)^2) \quad (4)'$$

An appropriate combination of spring loads F and f of the relief valve spring 17 and the check valve spring 28 is selected based on the above equation for satisfying the condition 2 to set the relief valve spring 17 and the check valve spring 28 respectively.

Let the diameter of the valve seat (measured at the middle of the seat width) of the relief valve 4 be, $D_2$=10.95 cm, the diameter of the check valve seat 19 (measured at the middle of the seat width) be, x=5 cm, the thickness of the valve seat 11 of the relief valve 4 be, t=0.1 cm, and the desired pressure difference for opening the relief valve 4 be, $\Delta P$=10 kPa.

Using the equation (2),

The effective diameter of the diaphragm 14, $D_1$, was calculated to be 11.15 cm.

Based on the equation (4)', the relief valve spring 17 and the check valve spring 28 were selected to satisfy the following:

spring load of the relief valve 17, F=24.5 N spring load of the check valve 28, F=39.2 N From the above equation (3), the friction resistance force α is calculated to be 71.15 N.

When a water hammering prevention device 1 was used and the upstream pressure $P_1$ was changed from 0.1 to 1 MPa, the valve opening pressure difference $\Delta P$ of the relief valve 4 was approximately 10 kPa in average.

Therefore, this water hammering prevention device 1 was able to maintain the pressure of the midstream section 8b to be always lower than the upstream side pressure $P_1$ by a margin $\Delta P$ of a constant value (approximately 10 kPa).

Figure 10:
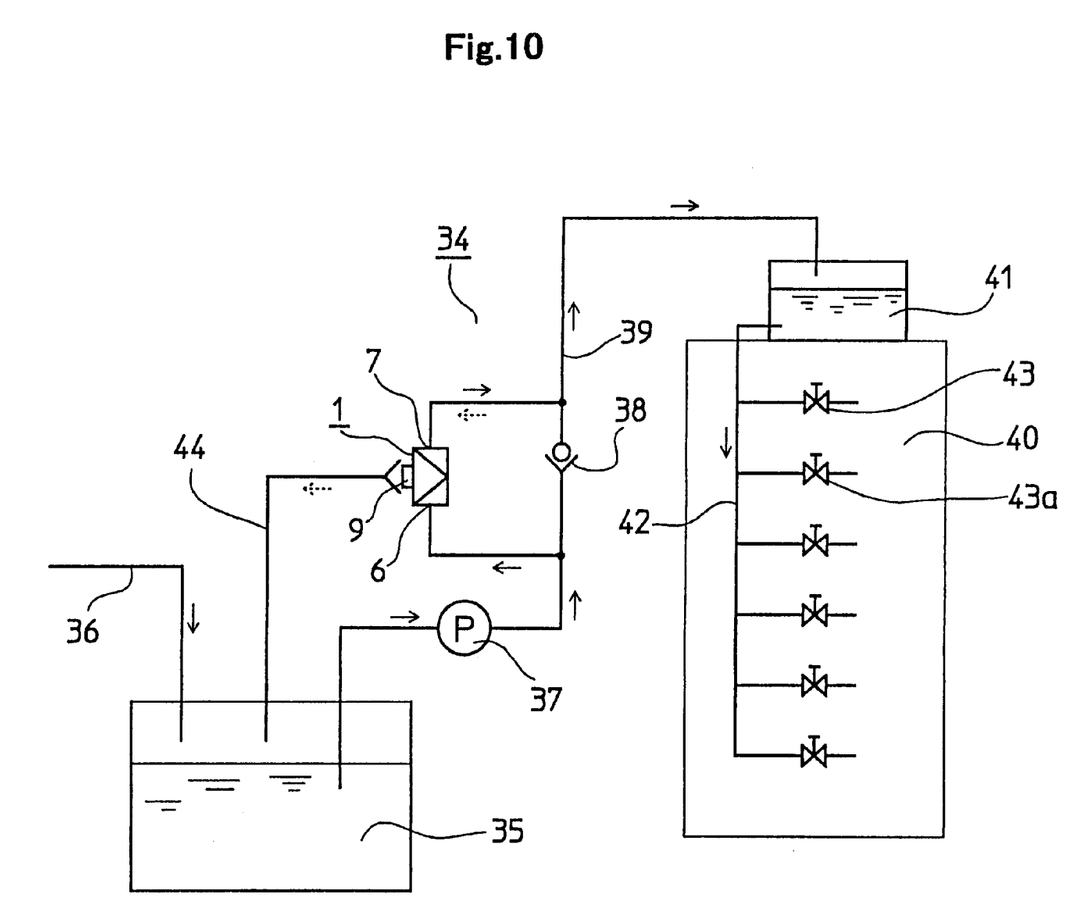
Figure 11:
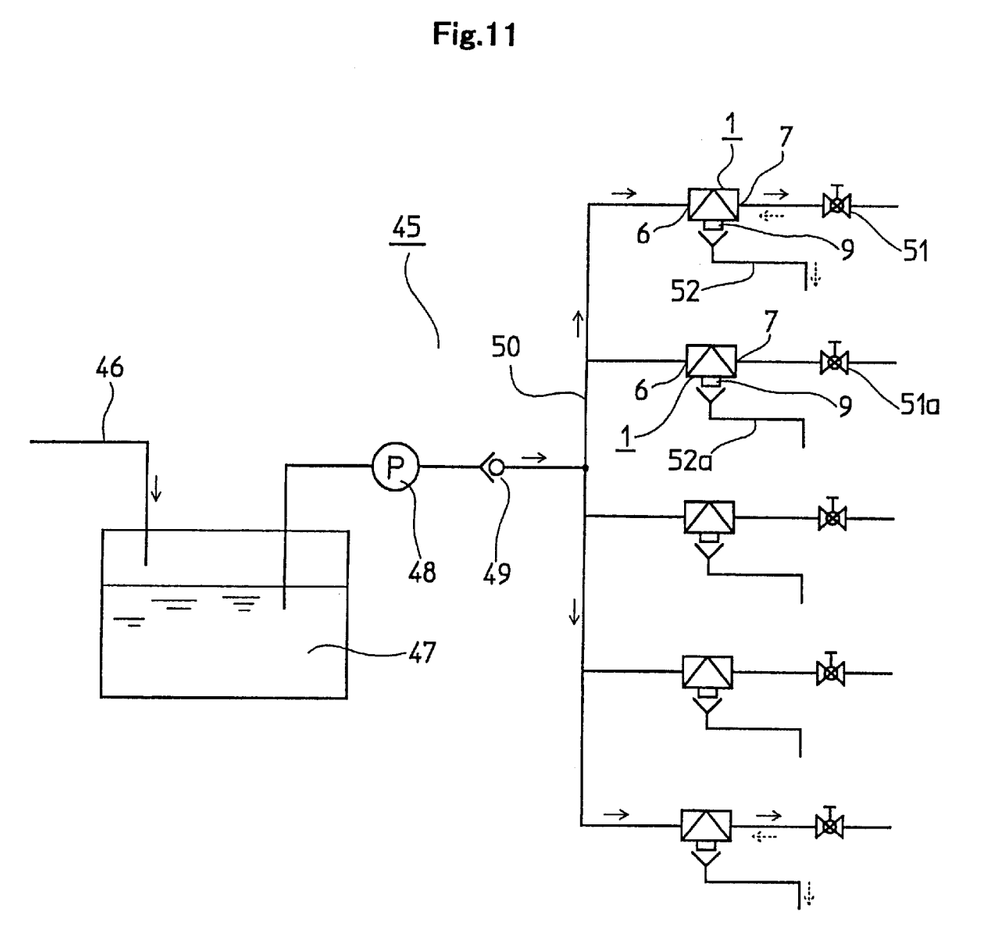
FIG. 11 is a drawing showing another example of piping.

Next, let us describe an example piping of the water hammering prevention device 1 with reference to FIGS. 10 and 11.

FIG. 10 is a schematic drawing of a elevated tank type water supply device 34.

The drawing shows a water receiving tank 35, to which main water piping 36 is connected. Said water tank 35 is connected to an elevated tank 41 on the rooftop of a building 40 via a lifting pipe 39 as well as a lifting pump 37 and a check valve 38. From the lifted tank 41, water supply piping 42 connects to faucets 43, 43a, etc.

The water hammering device 1 is connected in parallel to said check valve 38, i.e., its inlet port 6 and outlet port 7 are connected to the lifting pipe 39 on the upstream and downstream sides of the check valve 38 respectively, and its drain port 9 is connected to said water receiving tank 35 via piping.

The drain port 9 secures a specified drain port space (gap) as it connects to a drain path 44 so that water will be indirectly drained by gravity to the receiving tank 35.

In the water supply device 34, it also becomes possible to abolish the check valve 38 and install the water hammering prevention device 1 in the same place as the check valve 38.

In this case, the inlet port 6 and the outlet port 7 of the water hammering prevention device 1 are connected in the middle of the lifting pipe 39, one at the upstream side and the other at the downstream side respectively, and the drain port 9 is connected to the water receiving tank 35.

Although the piping example for the water hammering prevention device 1 is shown for the elevated tank type water supply device 34, the water hammering prevention device 1 can be connected in the middle of the piping where water hammering occurs with the drain port 9 being connected to the water receiving tank in other types of water supply devices.

FIG. 11 is a schematic drawing of a high pressure water injection water supply device 45 installed in manufacturing plants and other work places for the purpose of washing various things.

This water supply device 45 has a water receiving tank 47, to which a main water piping 46 is connected. From the tank, a water supply pipe 50 extends to a turbine pump 48 and a check valve 49, and eventually to high pressure water injection guns 51, 51a which are terminal equipment provided at each end of the pipe.

A water hammering prevention device 1 is installed in the water supply piping 50 in such a way as to be connected in series with each high pressure water injection gun 51, 51a, etc.

The inlet port 6 and the outlet port 7 of the water hammering prevention device 1 are connected to the upstream side and the downstream side of the water supply piping 50, and the drain port 9 , similar to that shown before, which secures a specified drain port space as it connects to drain path 52 so that water will be indirectly drained outside by gravity; as an alternative, said drain paths 52, 52a can be connected via piping (not shown) to the water receiving tank 47.

Next, let us describe the operation of the water hammering prevention device 1 referring to FIGS. 1 through 3, 10 and 11.

When water is not running, the relief valve 4 and the check valve 5 are both closed as shown in FIG. 1.

When water is running, as shown in FIG. 2, the relief valve 4 is closed due to the upstream side pressure similar to the case when water is not running, and the check valve 5 is opened. In case of the water supply systems 34 and 45 shown in FIGS. 10 and 11, water is supplied either to faucets, 43, 43a, etc., or high pressure water injection guns 51, 51a, etc., which are respective terminal equipment.

When a water hammering action occurs in the downstream side of the water hammering prevention device 1 as in the case of closing the faucets 43, 43a, or high pressure water guns 51, 51a the downstream side pressure (reverse pressure) becomes higher than the upstream side pressure, so that, as shown in FIG. 3, the check valve 5 closes and reverse pressure is applied to the relief valve 4 opposing the valve closing pressure, so that the relief valve 4 will be pressed in the upstream direction to cause it open, and the midstream section 8b communicates with the drain paths 44, 52, 52a via drain port 9 to drain the pressurized fluid.

Thus, the reverse pressure is drained to the outside and the water hammering action is prevented.

When the reverse pressure disappears and the downstream side pressure becomes lower than the upstream side pressure, or, in the case where the midstream section 8b is pressure controlled as mentioned before, the pressure difference between the upstream side pressure and the midstream section pressure (same as the downstream side pressure) returns to the preset value, the relief valve 4 closes.

The water, which is drained when the relief valve 4 opens, is returned to the water receiving tank 35 via the drain path 44 in the case of the water supply device 34, and is drained by gravity in the case of the water supply device 45 or returned to the water receiving tank 47 in the alternative case where the drain path 52 is connected via piping to the water receiving tank 47.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. Water hammering prevention device comprising: an outer box having concentric flow paths for an inlet and an outlet and a drain port in a midstream section of the flow path; an inner tube member having a diaphragm on its periphery dividing an inside of said outer box into an upstream section and an area consisting of the midstream section and a downstream section of the flow path, wherein said inner tube member slidingly fits into the upstream section; a relief valve provided on an end face of a downstream side opening of said inner tube member, said relief valve being capable of moving toward or away from a valve seat located on the periphery of a valve port provided between the midstream section and the downstream section, said relief valve being energized by a relief valve spring toward a valve opening direction; and a check valve provided inside the inner tube member to prevent fluid from flowing backward from the downstream side, wherein an effective diameter of said diaphragm is chosen to be approximately equal to a valve seat diameter of said relief valve in order to achieve a pressure balance between a valve closing pressure and a valve opening pressure applied to the relief valve, and spring loads of the relief valve spring and a check valve spring, which check valve spring energizes the check valve in a valve closing direction, are chosen so that a midstream pressure is always lower by a constant value than an upstream pressure.

2. Water hammering prevention device of claim 1 wherein said device is connected in parallel to a check valve installed in the piping of a water supply device and said drain port is connected to a water receiving tank via piping.

3. Water hammering prevention device of claim 1 wherein said device is connected in series to terminal equipment of a water supply device, and said drain port is connected to the outside.

4. Water hammering prevention device of claim 1 wherein said device is installed in piping and said drain port is connected to a water receiving tank via piping.

5. Water hammering prevention device of claim 1 wherein said device is connected in series to terminal equipment of a water supply device and said drain port is connected to a water receiving tank via piping.

6. Water hammering prevention device of claim 1 wherein said valve port is defined in a downstream end of said outer box, said check valve cooperates with a valve seat defined on a periphery of a check valve port, said check valve port being defined in an upstream end of said inner tube member.

7. Water hammering prevention device of claim 1 wherein water hammer causes the midstream pressure to become higher than the upstream pressure thereby causing the opening of the relief valve to permit discharge of pressurized fluid into said drain port, and the relief valve is normally maintained in a closed position when fluid is flowing through said device and also when fluid is not flowing through said device.

8. Water hammering prevention device comprising: an outer box having concentric flow paths for an inlet and an outlet and a drain port in a midstream section of the flow path; an inner tube member having a diaphragm on its periphery dividing an inside of said outer box into an upstream section and an area consisting of the midstream section and a downstream section of the flow path, wherein said inner tube member slidingly fits into the upstream section; a relief valve provided on an end face of a downstream side opening of said inner tube member, said relief valve being capable of moving toward or away from a valve seat located on the periphery of a valve port provided between the midstream section and the downstream section, said relief valve being energized by a relief valve spring toward a valve opening direction; and a check valve provided inside the inner tube member to prevent fluid from flowing backward from the downstream side, said check valve having a flat surface formed on its face confronting a check valve port, said flat surface having a diameter smaller than the check valve port, a conical apex formed in the middle of said flat surface, and multiple grooves formed in an equally spaced manner in the circumferential direction on the check valve and having a groove width decreasing gradually from an outer periphery of the check valve toward a center of a downstream side thereof, said outer periphery being located outwardly of a seating area corresponding to a check valve seat.

9. Water hammering prevention device of claim 8 wherein an effective diameter of said diaphragm is substantially equal to a diameter of said valve seat in order to achieve a pressure balance between a valve closing pressure and a valve opening pressure applied to the relief valve and spring loads of the relief valve spring and a check valve spring which biases the check valve in a closing direction are chosen so that a midstream pressure is normally lower by a constant value than an upstream pressure.

10. Water hammering prevention device of claim 9 wherein the relief valve is normally maintained in a closed position until the midstream pressure becomes higher than the upstream pressure due to water hammer, whereupon the relief valve opens to allow discharge of pressurized fluid into said drain port.

11. A device for preventing water hammer comprising:

a housing defining a flow path having an inlet end, an outlet end and a drain port disposed between said inlet and outlet ends;

an inner tubular member slidably disposed within said housing, and an annular diaphragm interconnecting a periphery of said tubular member with said housing and dividing said flow path into an upstream side and a downstream side;

a relief valve including a valve member defined on a downstream end of said tubular member and a valve seat provided in said housing, said valve member being biased in an opening direction away from said valve seat by a first spring; and a check valve slidably disposed within said tubular member to prevent a reverse flow of fluid within said device, said check valve being biased in a closing direction by a second spring;

said diaphragm having an effective diameter which is substantially equal to a diameter of said valve seat to provide a balance between valve closing and opening pressures imposed on said valve member and the loads of said first and second springs are set such that a downstream pressure is lower than an upstream pressure to normally maintain said relief valve in a closed position when fluid is flowing through said device and also when fluid is not flowing through said device, and upon the downstream pressure becoming higher than the upstream pressure due to water hammer, said relief valve opens to allow discharge of pressurized fluid into said drain port.

12. The device of claim 11 wherein said diaphragm is disposed on said downstream end of said tubular member closely adjacent said valve member, and said check valve cooperates with a check valve seat defined on an opening located in an upstream end of said tubular member.

13. The device of claim 11 wherein when fluid is flowing through said device said check valve is open and said relief valve is closed, when fluid is not flowing through said device both said check valve and said relief valve are closed, and when water hammer occurs said check valve is closed and said relief valve is open to drain the pressurized fluid into said drain port.

* * * * *